(12) United States Patent
Hammerschmidt (10) Patent No.: US 8,710,963 B2
(45) Date of Patent: Apr. 29, 2014

(54) RECEIVER AND TRANSMITTER RECEIVER SYSTEM

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 411 days.

(21) Appl. No.: 13/046,891

(22) Filed: Mar. 14, 2011

(65) Prior Publication Data

US 2012/0235800 A1    Sep. 20, 2012

(51) Int. Cl.
  *G05B 11/01*    (2006.01)
(52) U.S. Cl.
  USPC ...................................................... 340/12.22
(58) Field of Classification Search
  USPC .......... 340/12.22, 517, 537, 538.11; 455/126, 455/39
  See application file for complete search history.

(56) References Cited

U.S. PATENT DOCUMENTS

| | | |
|---|---|---|
| 6,608,566 B1 | 8/2003 | Davis |
| 2008/0123815 A1 | 5/2008 | Feda |
| 2009/0076760 A1 | 3/2009 | Schumacher et al. |
| 2009/0205436 A1 | 8/2009 | Garverick et al. |
| 2012/0056642 A1 | 3/2012 | Song et al. |
| 2012/0101595 A1 | 4/2012 | Jung et al. |
| 2012/0307229 A1 | 12/2012 | Conroy et al. |
| 2013/0033357 A1 | 2/2013 | Hammerschmidt |
| 2013/0043908 A1 | 2/2013 | Hammerschmidt |
| 2013/0063166 A1 | 3/2013 | Ng et al. |

FOREIGN PATENT DOCUMENTS

| | | |
|---|---|---|
| DE | 3912439 A1 | 10/1990 |
| DE | 4228047 A1 | 4/1993 |
| DE | 10340431 A1 | 4/2004 |
| DE | 102008041030 A1 | 2/2010 |

OTHER PUBLICATIONS

U.S. Appl. No. 13/430,015, filed Mar. 26, 2012. 35 Pages.
Infineon Technologies. "Differential Two-Wire Hall Effect Sensor IC." Published in Feb. 2002. 18 Pages.
Discrete Semiconductors. "Rotational Speed Sensor for Extended Air Gap Application and Direction Detection." Published on Sep. 4, 2004. 16 Pages.
Infineon Technologies. "TLE4941/4941C Smart Hall Effect ICs for Active Wheel Speed Sensing." Published in 2006. 2 Pages.
U.S. Appl. No. 13/908,389, filed Jun. 3, 2013. 47 Pages.
Office Action dated Apr. 25, 2013 for U.S. Appl. No. 13/430,015.
U.S. Appl. No. 13/212,463, filed Aug. 18, 2011. 23 Pages.
Tietze, U. et al. "Electronic Circuits: Design and Applications." ISBN 3-540-50608-X. Berlin, Heidelberg ; New York : Springer. Kapitel 23.6-23.8 : AD-Umsetzer, S. Published in 1991. pp. 690-711.
U.S. Appl. No. 13/197,288, filed Aug. 3, 2011. 22 Pages.
Dahono, Pekik Argo. "A Control Method for DC-DC Converter That Has an LCL Output Filter Based on New Virtual Capacitor and Resistor Concepts." 2004 35th Annual IEEE Power Electronics Specialists Conference. 7 Pages.

(Continued)

*Primary Examiner* — Vernal Brown
(74) *Attorney, Agent, or Firm* — Eschweiler & Associates, LLC (57) ABSTRACT

A receiver for receiving messages from a transmitter includes a controller and a driver stage for providing a supply voltage to the transmitter based on a control signal. The controller is configured to provide the control signal to compensate for changes of the supply voltage caused by a modulation of the current consumption of the transmitter, such that the supply voltage remains in a predefined range. Furthermore, the controller is configured to evaluate a series of succeeding values of the control signal to derive a message generated by the transmitter by modulating its current consumption.

30 Claims, 7 Drawing Sheets

(56) References Cited

OTHER PUBLICATIONS

DSI3 Bus Standard. Jul. 2, 2010. 46 Pages.

PSI5 Peripheral Sensor Interface. Peripheral Sensor Interface for Automotive Applications. 47 Pages.

Wessels, Christian, et al. "Active Damping of LCL-Filter Resonance based on Virtual Resistor for PWM Rectifiers—Stability Analysis with Different Filter Parameters." Insitute of Power Electronics and Electrical Drives Kaiserstr. 2, 24143 Kiel, Germany. 7 Pages.

Micrel : MIC 184 Local/Remote Thermal Supervisor. Firmenschrift, Micrel, Inc. : Data Sheet MIC184, May 2006. San Jose: Micrel, 2006. 20 Pages.

Hägglund, Tore : New Estimation Techniques for Adaptive Control. Doctoral Dissertation, The Swedish Board for Technical Development (STU), Document No. : CODEN : LUTFD2/(TFRT-1025)/1-120/(1983). Lund, Sweden : Lund University, Department of Automatic Control, Dec. 1983. 118 Pages.

Non-Final Office Action dated Nov. 8, 2013 for U.S. Appl. No. 13/430,015. 22 Pages.

RECEIVER AND TRANSMITTER RECEIVER SYSTEM

FIELD

Embodiments of the present invention create a receiver for receiving messages from a transmitter. Further embodiments of the present invention create a transmitter receiver system for transmitting messages from the transmitter to the receiver. Further embodiments of the present invention create a method for receiving messages.

BACKGROUND

Sensors are often located outside the ECU (electrical control unit), for example, of a car. Thus, the sensors have to be connected via wires of several meters. These wires are a significant cost factor in automotive systems and further contribute to the weight of the car. Thus, the number of wires to connect a sensor is often limited to the minimum of two lines. These lines are used to supply the sensor and to transmit the data back to the ECU by modulation of the current consumption of the sensor.

SUMMARY

Embodiments of the present invention create a receiver for receiving messages from a transmitter. The receiver comprises a controller and a driver stage. The driver stage is configured to provide a supply voltage to the transmitter based on a control signal. The controller is configured to provide the control signal to compensate changes of the supply voltage caused by a modulation of the current consumption of the transmitter, such that the supply voltage remains in a predefined range. Furthermore, the controller is configured to evaluate a series of succeeding values of the control signal to derive a message generated by the transmitter by modulating its (the transmitters) current consumption.

BRIEF DESCRIPTION OF THE DRAWINGS

Embodiments of the present invention will be described in the following using the accompanying figures, in which:

FIG. 4b shows a simplified version of the digital model shown in FIG. 4a;

DETAILED DESCRIPTION

Before embodiments of the present invention will be explained in more detail using the accompanying figures, it is to be pointed out that the same elements or elements with the same function will be provided with the same reference numbers and that a repeated description of elements provided with the same reference numbers is omitted. Therefore, descriptions of elements provided with the same reference numbers are mutually exchangeable.

Figure 1:
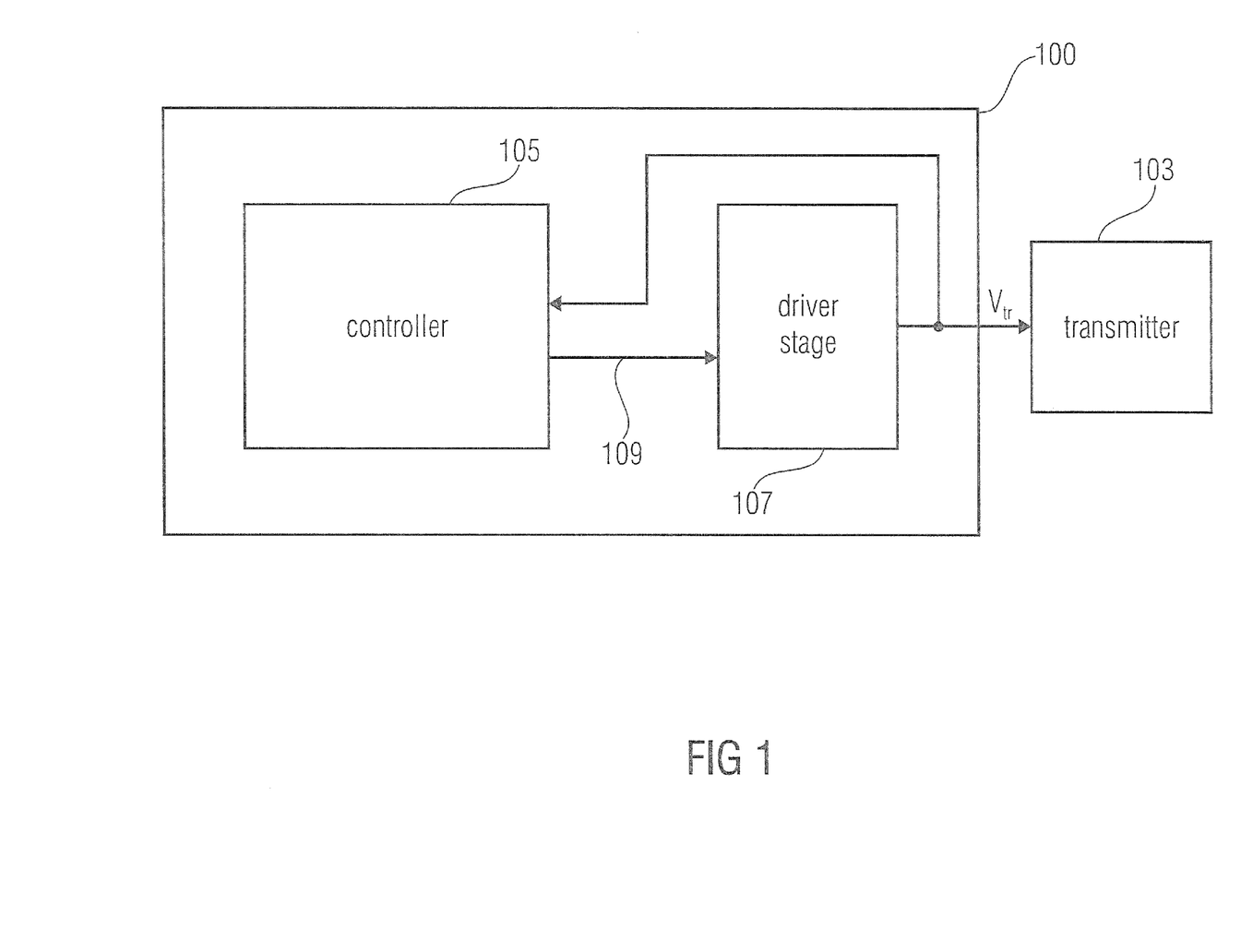
FIG. 1 shows a block schematic diagram of a receiver according to an embodiment of the present invention.

FIG. 1 shows a block schematic diagram of a receiver 100 according to an embodiment of the present invention. The receiver 100 is coupled to a transmitter 103. The receiver 100 for receiving messages from the transmitter 103 comprises a controller 105. Furthermore, the receiver 100 comprises a driver stage 107 for providing a supply voltage $V_{tr}$ to the transmitter 103 based on a control signal 109. The controller 105 is configured to provide the control signal 109 to compensate changes of the supply voltage $V_{tr}$ caused by a modulation of the current consumption of the transmitter 103, such that the supply voltage $V_{tr}$ remains in a predefined range. Furthermore, the controller 105 is configured to evaluate a series of succeeding values of the control signal 109 to derive a message generated by the transmitter by modulating its current consumption.

As mentioned in the introductory part of this application there is a need for a low number of wires between a transmitter and a receiver. By modulating its current consumption the transmitter 103 can transmit a message to the receiver 100, which detects the modulation of the current consumption. The receiver 100 in FIG. 1 derives the message from the transmitter 103 not by measuring the current consumption of the transmitter 103 but by evaluating the control signal 109 for the driver stage 107 needed to keep the supply voltage $V_{tr}$ in the predefined range. The modulation of the current consumption of the transmitter 103 would result in a decrease or an increase of the supply voltage $V_{tr}$, but the controller 105 compensates for this by providing the control signal 109, such that the supply voltage $V_{tr}$ remains in the predefined range. Therefore, the controller 105 provides different values of the control signal 109 to the driver stage 107 in dependence on, or in response to, the current modulation performed by the transmitter 103. Therefore, the controller 105 gains, by evaluating the series of succeeding values of the control signal 109 (which were provided to the driver stage 107), an information on the current modulation performed by the transmitter 103 and therefore an information of the message generated by the transmitter 103. Therefore, the controller 105 derives the message generated by the transmitter 103 based on the control signal 109 sent to the driver stage 107 for compensating the changes of the supply voltage $V_{tr}$. Therefore, there is no need for monitoring a current consumption or a supply current to the transmitter 103 (provided by the driver stage 107) anymore. Therefore, a reduction of the complexity of the controller 100 is achieved compared to concepts, in which the supply voltage $V_{tr}$ and an actual supply current to a transmitter are monitored (for example, using two analog-to-digital converters) and are used for deriving a message sent by the transmitter.

As an example, compared to a system in which on an ECU receiver side the current of a sensor is led through a shunt and fed into an ADC input, this shunt and this ADC for measuring the current consumption of the sensor can be omitted when using embodiments of the present invention. This leads to a further advantage which is a reduced power consumption by avoiding the voltage drop across the shunt.

According to further embodiments, the controller 105 may comprise a feedback ADC (the ADC can be reduced to a single comparator (1 bit ADC)) for measuring the supply voltage $V_{tr}$. Or in other words, the controller 105 may comprise (only) one ADC for monitoring the supply voltage $V_{tr}$ of the transmitter 103. Compared to this, in known concepts the supply voltage regulator is controlled digitally by measuring the feedback (the supply voltage of a sensor) with a first analog-to-digital converter and the current measurement of the sensor requires a second analog-to-digital converter (alternatively the voltage could be controlled analog e.g. using an OPAMP and measuring the current with an ADC). These receivers often serve multiple sensor channels and they are thus sensitive to cost of parts that are needed in every channel. Therefore, embodiments enable a reception of a current signal (of a current modulated message) without a shunt and without a current measurement ADC. A further advantage of embodiments is that the minimum of the supply voltage that is required by the voltage drop at the shunt (e.g. R*I=50 mA*10 Ohm=500 mV) and the consumed power is decreased.

As mentioned above, in one embodiment the feedback ADC may be a single comparator, wherein a threshold voltage of the comparator may be equal to a desired supply voltage of the transmitter 103. The comparator (as part of a control loop) may continuously output a (digital) correction signal, the correction signal determining if the supply voltage of the transmitter 103 is currently above or below the desired supply voltage. Based on the correction signal the controller 105 may generate the control signal 109 for adjusting the supply current of the transmitter 103, such that the supply voltage of the transmitter 103 remains (at least nearly) constant, even during a current modulation performed by the transmitter 103. Because of the fact, that it is nearly impossible to adjust the supply voltage such that it matches the threshold voltage of the comparator, the correction signal from the comparator quickly alternates. The driver stage 107 and the controller 105 may be chosen, such that the frequency at which the correction signal alternates is at least two times, five times, ten times or fifty times larger than a maximum modulation frequency of the current modulation performed by the transmitter 103.

According to some embodiments, the controller 105 may be configured to provide the control signal 109 such that during a current modulation of the transmitter 103 the supply voltage $V_{tr}$ will vary at maximum by 5%, 10%, 20% or 25%. In one embodiment, short transients of the supply voltage $V_{tr}$ (for example directly after a change of the current consumption of the transmitter 103) shall not be regarded. In other words, only steady states of the current consumption of the transmitter 103 shall be regarded.

According to a further embodiment of the present invention the controller 105 may be configured to provide the control signal 109 such that the supply voltage $V_{tr}$ remains constant for different values of the current consumption of the transmitter 103 (or for different supply currents into the transmitter 103).

According to further embodiments, the controller 105 may be configured to interpret rising or falling slopes of the current consumption of the transmitter 103 as information units (for example bits) of the message generated by the transmitter 103. Or in other words, the controller 105 may not necessarily derive an absolute value of the current consumption of the transmitter 103, for example, in cases in which the transmitter 103 transmits its message using a slope triggered coding mechanism, for example, like Manchester coding. In this case the controller 105 only needs to detect a change of the current consumption of the transmitter 103 (for example, above a certain threshold) by a certain difference between a last value of the control signal 109 and an actual value of the control signal 109 for keeping the supply voltage $V_{tr}$ of the transmitter 103 in the predefined range.

Furthermore, in one embodiment the controller 105 may be configured to interpret a decrease or an increase in the current consumption of the transmitter 103 as a falling slope or a rising slope of the current consumption if a difference between a value of the control signal 109 before the decrease or increase of the current consumption and a value of the control signal 109 for compensating the decrease or increase of the current consumption is above a given threshold. Or in other words, in this embodiment the controller 105 may only interpret a change of the current consumption of the transmitter 103 as an information unit of the message generated by the transmitter 103, if the change of the current consumption is above a given threshold. Therefore, it can be avoided that the controller 105 detects an increase or decrease of the current consumption of the transmitter 103 as a rising or falling slope for the message, although the increase or decrease is caused by distortions e.g. caused by electromagnetic interferences in the wiring harness that contains the lines connecting the sensor with the ECU or drift effects, for example, generated by a variation of a temperature of the transmitter 103.

According to further embodiments the controller 105 may be configured to interpret a comparatively high current consumption of the transmitter 103 as a first information unit (for example a 1-bit) of the message generated by the transmitter 103 and a comparatively low current consumption of the transmitter 103 as a second information unit (for example a 0-bit) of the message generated by the transmitter 103. In other words, the controller 105 may determine absolute values of the current consumption of the transmitter 103 by evaluating the control signal 109 and may interpret a current consumption of the transmitter 103 above a given threshold as a first information unit of the message and a current consumption below the given threshold as a second information unit of the message. The given threshold may be variable and may change over temperature. This can be extended to multiple levels as well (e.g. QAM quadrature amplitude modulation).

Or in other words, the controller 105 may be configured to interpret different levels of current consumption of the transmitter between a minimum and a maximum current consumption as different information units of the message generated by the transmitter 103. Therefore, in one embodiment the controller 105 may be configured to detect additional levels of current consumption between the minimum and the maximum to receive more information within a timeslot.

According to an embodiment the comparatively high current consumption (for the first information unit) may be at least 10%, 20% or 50%, 100%, 400% larger than the comparatively low current consumption (for the second information unit). As an example, in psi 5 the minimum DC current of a sensor is specified to be 6 mA and the additional current to signal a high state is 20 mA-30 mA which makes a modulation by 400%-600%.

Figure 2:
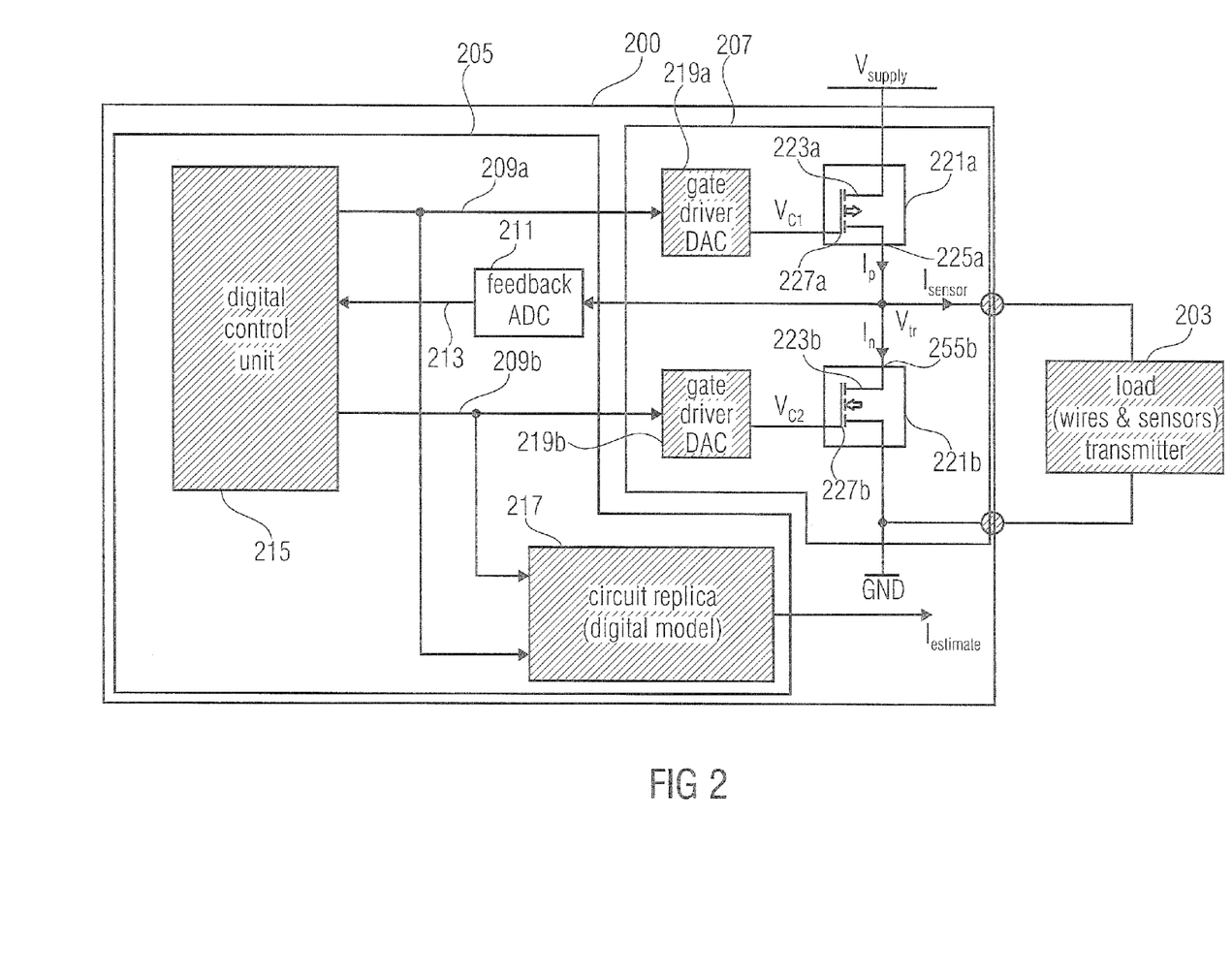
FIG. 2 shows a block schematic diagram of a receiver according to a further embodiment of the present invention.

FIG. 2 shows a block schematic diagram of a receiver 200 according to a further embodiment of the present invention. The receiver 200 is coupled to a transmitter 203. A functionality of the receiver 200 is similar to the functionality of the receiver 100 from FIG. 1, wherein the receiver 200 comprises the optional features described in the following. It is understood that further embodiments of the present invention may include one, some or all of the additional features described in the following in conjunction with the receiver 200.

The receiver 200 comprises a controller 205 and a driver stage 207 for providing a supply voltage $V_{tr}$ to the transmitter 203 based on control signals 209a, 209b. The controller 205 is configured to provide the control signals 209a, 209b to compensate changes of the supply voltage $V_{tr}$ caused by a modulation of the current consumption (of a supply current $I_{sensor}$) of the transmitter 203 such that the supply voltage $V_{tr}$ of the transmitter 203 remains in a predefined range. Furthermore, the controller 205 is configured to evaluate a series of succeeding values of the control signals 209a, 209b to derive a message generated by the transmitter 203 by modulating its current consumption.

The controller 205 comprises a feedback analog-to-digital converter (feedback-ADC) 211 for obtaining a digital representation 213 of the supply voltage $V_{tr}$ provided by the driver stage 207. As mentioned above, the feedback-ADC 211 may be a 1-bit ADC (a comparator).

The controller 205 (or a digital control unit 215 of the controller 205) is configured to evaluate the digital representation 213 of the supply voltage $V_{tr}$ to adjust the control signals 209a, 209b. By evaluating the digital representation 213 of the supply voltage $V_{tr}$, the controller 205 can adjust the control signals 209a, 209b for controlling the driver stage 207 based on the digital representation 213 of the supply voltage $V_{tr}$ only, in one embodiment.

Furthermore, by monitoring (for example storing) a series of succeeding values of the control signals 209a, 209b the controller 205 can obtain information describing the current consumption of the transmitter 203 and therefore a message sent by the transmitter 203 to the receiver 200. The controller 205 may continuously monitor the supply voltage $V_{tr}$ of the transmitter 203 using the feedback-ADC 211 and may continuously adjust the control signals 209a, 209b and may furthermore evaluate the control signals 209a, 209b provided to the driver stage 207 for deriving messages sent by the transmitter 203. From FIG. 2 it can be seen that for driving the messages from the transmitter 203 one analog-to-digital converter is fully sufficient and an analog-to-digital converter for deriving the current consumption of the transmitter 203 is not necessary. Therefore, compared to conventional systems, in which the current consumption of the transmitter 203 is measured together with the supply voltage of the transmitter 203 one ADC or an analog control loop can be omitted, as the controller 205 derives the message generated by the transmitter 203 not based on a measurement of the current consumption of the transmitter 203 but based on the control signals 209a, 209b for compensating changes of the supply voltage $V_{tr}$ caused by the current modulation of the transmitter 203.

As an example, the controller 205 may be configured such that different values of the control signals 209a, 209b correspond to different values of the supply current $I_{sensor}$ of the transmitter 203 and the controller 205 (or the digital control unit 215) may be configured to map the series of succeeding values of the control signals 209a, 209b to its corresponding values of the supply current $I_{sensor}$ of the transmitter 203 to derive a series of succeeding values of the supply current $I_{sensor}$ of the transmitter 203 representing the message generated by the transmitter 203. In an example, different values of the supply current $I_{sensor}$ may correspond with different information units (for example bits) of the message generated by the transmitter 203. In other words, the controller 205 may know (for example by using a digital model, a lookup table or by calibration) which values of the control signals 209a, 209b correspond to which values of the supply current $I_{sensor}$ of the transmitter 203 and therefore may derive the message generated by the transmitter 203 based on this information.

As an example for mapping values of the control signals 209a, 209b to values of the supply current $I_{sensor}$ of the transmitter 203, the controller 205 may comprise a digital model 217 of the driver stage 207 (or of an analog part of the driver stage 207). The digital model 217 may be configured to estimate (for example to calculate) the supply current of the supply current $I_{sensor}$ of the transmitter 203 based on the control signals 209a, 209b. The estimated supply current $I_{estimate}$ of the transmitter 203 can be used by the controller 205 (or the digital control unit 215) to derive the message generated by the transmitter 203. In one embodiment, the digital model 217 may comprise a calculation rule for calculating the estimated supply current $I_{estimate}$ based on the control signals 209a, 209b. A more detailed description of examples of the digital model 217 will be given below using the FIGS. 4a and 4b. The model may include the transient response of the driver e.g. a lowpass characteristic as well a nonlinear equation, e.g., the square law dependence of the drain current of a MOS transistor on the applied gate source voltage. The accuracy of the model can be limited to a level that is sufficient to receive the signal. This can be an approximation of the nonlinearity e.g. by a coarse lookup table or the limitation of the matching of the transient behavior to signals that are in the frequency range of the message that has to be received.

According to further embodiments, instead of using the digital model 217, the controller 205 may comprise a lookup table, the lookup table comprising a plurality of table entry pairs, each table entry pair comprising a value of the control signals 209a, 209b and its corresponding value of the supply current $I_{sensor}$ of the transmitter 203. The controller 205 may be configured to map a value of the control signals 209a, 209b to its associated value of the supply current $I_{sensor}$ of the transmitter 203 in the lookup table for deriving the information unit of the message generated by the transmitter 203 corresponding to the current value of the control signals 209a, 209b. For example, the lookup table may be calibrated by a vendor of the receiver 200 and be stored inside the controller 205. The lookup table can also have two independent variables e.g. the control signal itself and the previous sample of the control signal in order to cover a dynamic behavior. On the other hand the model could be split into two independent sections, e.g., a nonlinear equation or lookup table followed by a filter to model the dynamic behavior of the driver.

According to further embodiments the controller 205 (or the digital control unit 215) is configured to provide the control signals 209a, 209b as digital control signals. The driver stage 207 is configured to evaluate the digital control signals to provide the supply voltage $V_{tr}$ based on the digital control signals. Furthermore, the digital control signals can be provided directly to the digital model 217 for calculating the estimated supply current $I_{estimate}$ of the transmitter 203. The driver stage 207 comprises a first driver digital-to-analog converter (driver-DAC) 219a and a second driver-DAC 219b. The driver-DACs 219a, 219b may also be designated as gate driver DACs. Furthermore, the driver stage 207 comprises a first voltage controlled current source 221a and a second voltage controlled current source 221b for providing the supply voltage $V_{tr}$ to the transmitter 203. The driver DACs 219a, 219b are configured to provide control voltages $V_{c1}$, $V_{c2}$ to the voltage controlled current sources 221a, 221b based on the digital control signals 209a, 209b. In other words, the driver DACs 219a, 219b are configured to derive the control voltages $V_{c1}$, $V_{c2}$ for controlling the voltage controlled current source 221a, 221b based on the digital control signals 209a, 209b.

Although in the example shown in FIG. 2 the controller 205 provides the two control signals 209a, 209b, according to further embodiments the controller 205 may also provide only one control signal and the driver stage 207 may derive the control voltage $V_{c1}$ for the first voltage current source 221a and the control voltage $V_{c2}$ for the second current control voltage source 221b based on the one control signal.

Furthermore, according to further embodiments, the driver stage 207 may comprise only one driver DAC and only one voltage control current source for providing the supply voltage $V_{tr}$ for the transmitter 203 and therefore the controller 205 may also provide only one control signal to the driver stage 207.

In one embodiment of the receiver 200 shown in FIG. 2 the first voltage controlled current source 221a is implemented using a first transistor 223a. The second voltage control current source 221b is implemented using a second transistor 223b. The first transistor 223a is a PMOS transistor and the second transistor 223b is an NMOS transistor. A drain terminal 225a of the first transistor 223a is coupled to a drain terminal 225b of the second transistor 223b. The supply voltage $V_{tr}$ of the transmitter 203 is provided at the drain terminal 225a of the first transistor 223a. The driver stage 207 is configured to vary a gate potential at a gate terminal 227 of the first transistor 223a for controlling the drain source current $I_p$ of the first transistor 220a and therefore the supply voltage $V_{tr}$ of the transmitter 203. The driver DAC 219a is connected to the gate terminal 227a of the first transistor 223a for applying the first control voltage $V_{c1}$ as the gate potential of the first transistor 223a. Furthermore, the supply voltage $V_{tr}$ is a function of a drain source current $I_n$ of the second transistor 223b. The second driver DAC 219b is connected to a gate terminal 227b of the second transistor 223b for applying the second control voltage $V_{c2}$ as the gate potential of the second transistor 223b. Therefore, the supply voltage $V_{tr}$ is a function of the drain source current $I_p$ of the first transistor 223a and of the drain source current $I_n$ of the second transistor 223b. The driver stage 207 controls the drain source currents $I_p$, $I_n$ by varying the gate potentials of the transistors 223a, 223b based on the control signals 209a, 209b.

Furthermore, the feedback ADC 211 is coupled (for example directly connected) to the drain terminal 225a of the first transistor 223a for sensing the supply voltage $V_{tr}$.

As an example, upon a detection of an increased current consumption of the transmitter 203, the driver stage 207 may lower the gate potential (and therefore the first control voltage $V_{c1}$) of the first transistor 223a, such that the drain source current $I_p$ (or an absolute average value of the drain source current $I_p$) is increased, and may also lower the gate potential (and therefore the second control voltage $V_{c2}$) of the second transistor 223b such that the drain source current $I_n$ (or an absolute average value of the drain source current $I_n$) of the second transistor 223b is decreased. Upon a detection of a decrease of the current consumption of the transmitter 203, the driver stage 207 may raise the gate potentials of the transistors 223a, 223b such that the drain source current $I_p$ (or an absolute average value of the drain source current $I_p$) of the first transistor 223a decreases and the drain source current $I_n$ (or an absolute average value of the drain source current $I_n$) of the second transistor 223b increases.

As mentioned before, according to further embodiments the second voltage controlled current source 221b may be omitted, and therefore the second transistor 223b may be omitted, such that the supply voltage $V_{tr}$ is (only) a function of the drain source current $I_p$ of the first transistor 223a.

In short, the receiver 200 uses the PMOS and NMOS transistors 223a, 223b acting as controlled current sources 221a, 221b to increase or decrease the sensor supply current $I_{sensor}$ on demand of the (digital) controller 205 (or in demand of the digital control unit 215). Thus, the digital controls signals 209a, 209b influence the sensor supply current $I_{sensor}$ and the (digital) model 217 of the analog part can be expected to be simple.

According to some embodiments, the gate driver DACs 219a, 219b may be identical and the transistors 223a, 223b may have corresponding dimensions, such that a change of the current consumption of the transmitter 203 results in a change of the control voltages $V_{c1}$, $V_{c2}$ by the same voltage difference.

According to further embodiments the MOS transistors 223a, 223b may be replaced by transistors of other types, for example, by bipolar transistors. Therefore, a source terminal may correspond to an emitter terminal, a drain terminal may correspond to a collector terminal, a gate terminal may correspond to a base terminal and a drain source current may correspond to a collector emitter current.

As an example, the transmitter 203 may comprise a load (e.g. one or more wires and sensors).

Figure 3:
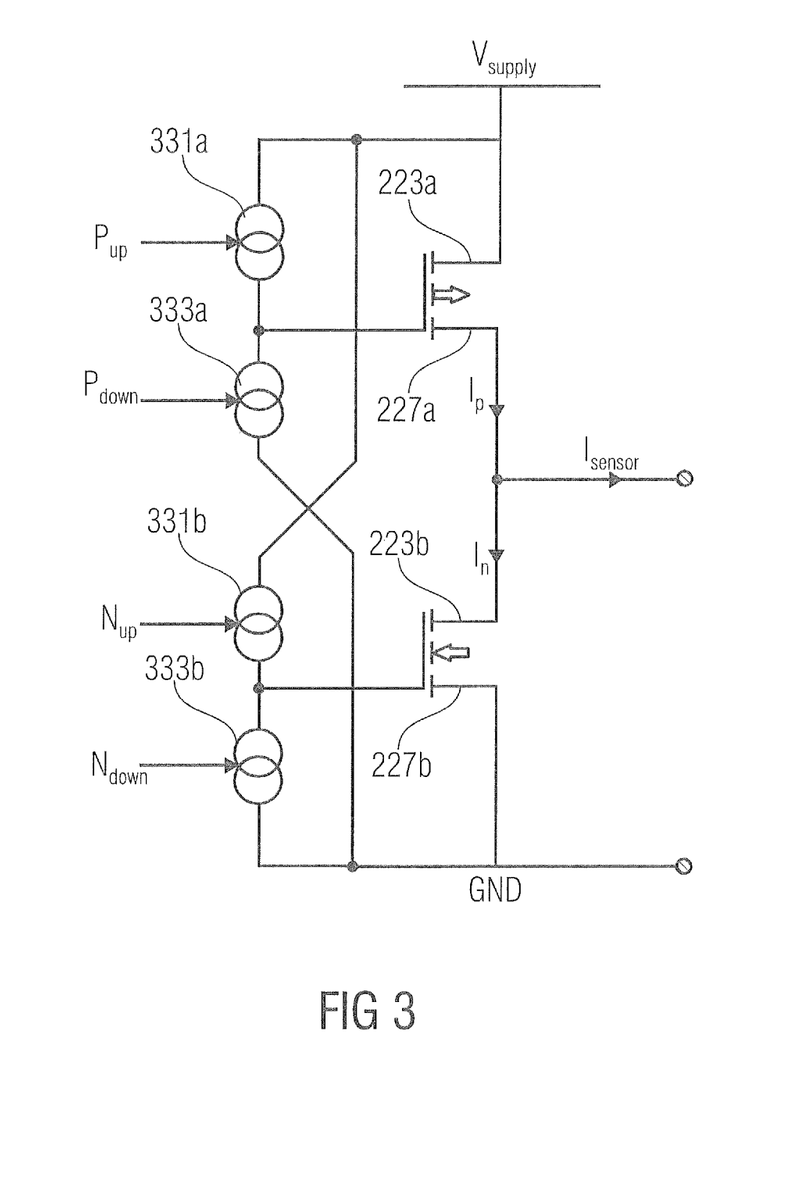
FIG. 3 shows a schematic circuit of a possible implementation for an analog part of a driver stage of a receiver according to an embodiment.

FIG. 3a shows in a schematic circuit diagram a more detailed example of a possible implementation of the (analog part of the) driver stage 207 (of the supply regulator loop). The gate drivers (the analog parts of the driver DAC 219a, 219b) are implemented as current sources 331a, 331b, 333a, 333b that charge or discharge the gates 227a, 227b of the pass device MOS transistors 223a, 223b. The current sources 331a, 331b, 333a, 333b may be implemented, for example as switchable MOS current mirrors. The driver DACs 219a, 219b may be current steering DACs.

Based on the first control signal 209a a first gate driver current source 331a associated with the first transistor 223a may charge the gate terminal 227a of the first transistor 223a and a second gate driver current source 333a associated with the first transistor 223a may discharge the gate terminal 227a of the first transistor 223a.

Based on the second control signal 209b a first gate driver current source 331b associated with the second transistor 223b may charge the gate terminal 227b of the second transistor 223b and a second gate driver current source 333b associated to the second transistor 223b may discharge the gate terminal 227b of the second transistor 223b.

As already described, the current measurement of the supply current $I_{sensor}$ is derived from the digital control output signals 209a, 209b and estimated by the digital model 217 that describes the behavior of the regulators (the receiver's) analog part (e.g. the gate drivers 219a, 219b and the MOS pass devices 223a, 223b).

Figure 4A:
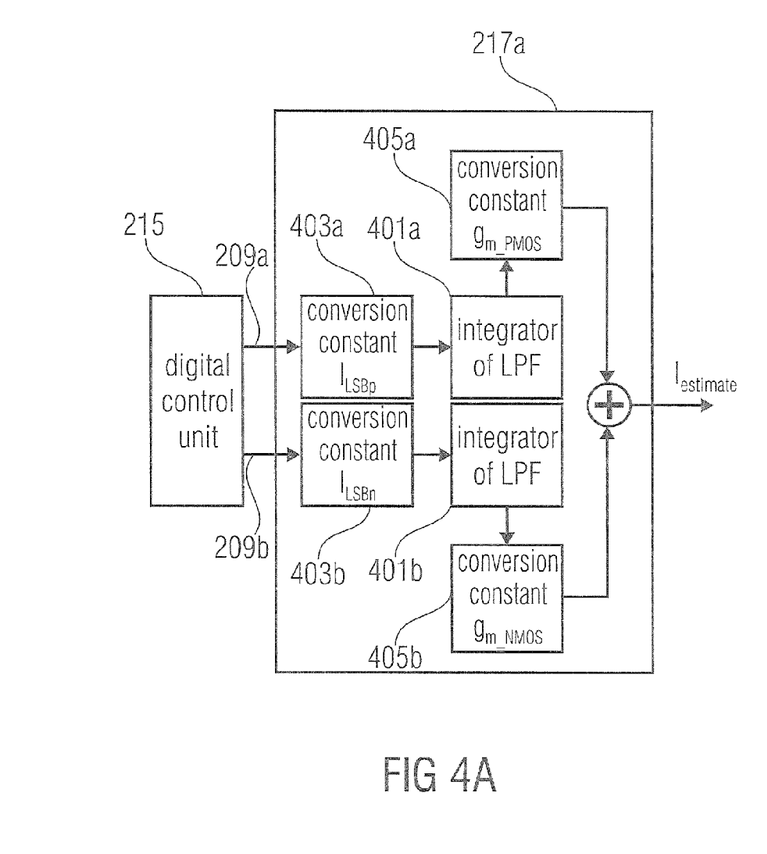
FIG. 4a shows a possible implementation for a digital model of a driver stage of the receiver from FIG. 2.
Figure 4B:
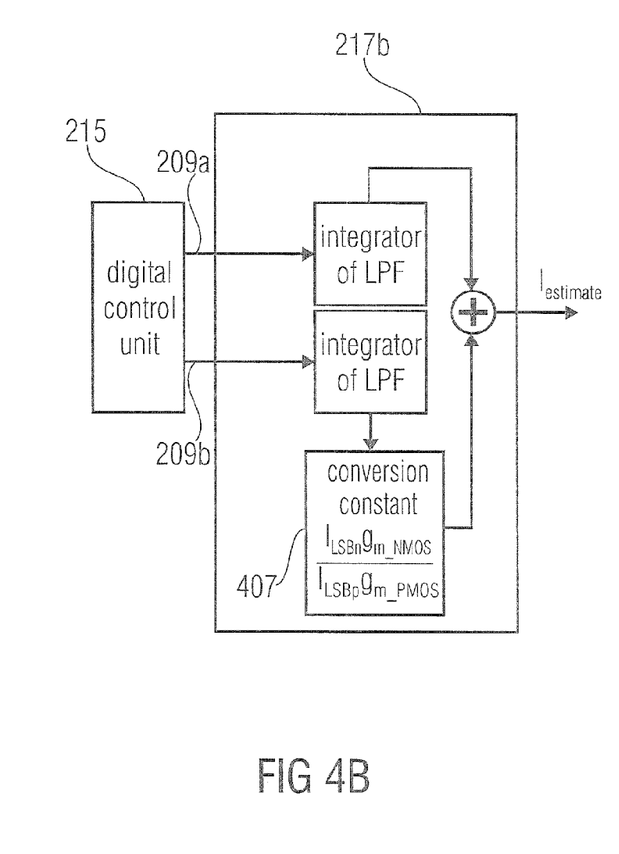

FIG. 4a shows in a schematic block diagram a possible implementation 217a of the digital model 217 of the output stage (of the driver stage 207). A more simplified implementation 217b of the digital model 217 is shown in FIG. 4b.

The digital model 217a shown in FIG. 4a simply consists of a digital representation of the gate driver mechanism comprising digital integrators or low pass filters 401a, 401b with a corner frequency below the frequency of a current modulation expected from the transmitter 203 (or from the sensor 203) and conversion constants 403a, 403b, 405a, 405b that represent the current DACs 219a, 219b and the transconductance of the pass device MOS transistors 223a, 223b.

The digital model 217a receives as input signals the first digital control signal 209a and the second control signal 209b from the digital control unit 215 (may be also designated as digital controller 215). The conversion constants 403a, 403b ($I_{LSBn}$, $I_{LSBp}$) represent the gate driver DACs 219a, 219b converting the digital control signals 209a, 209b into the control voltages $V_{c1}$, $V_{c2}$ (or into charge currents for the gates of the transistors 323a, 223b). The integrators or low pass filters 401a, 401b model a low pass filter formed between inner resistances of the gate driver DACs 219a, 219b and the gate capacitances of the transistors 223a, 223b. The conversion constants 405a, 405b ($g_{m\_NMOS}$, $g_{m\_PMOS}$, $g_{m\_NMOS}$) model the transistors 233a, 233b.

In the digital model 417a shown in FIG. 4a nonlinearities of the transistors 223a, 223b are not regarded, as these do not significantly influence the decoding of the current modulated message of the transmitter 203.

Especially in cases in which the transmitter 203 uses slope based communication protocols (like Manchester), absolute values of the current consumption of the transmitter 203 are not as relevant as differences between the current consumption of the transmitter 203, therefore even the conversion constants 405a, 405b for the transistors 223a, 223b may be omitted.

As mentioned before, FIG. 4b shows in one embodiment a simplified version 217b of the digital model 217a shown in FIG. 4a. In the digital model 217b all conversion constants from the digital model 217a are collected into one common conversion constant 407 ($I_{LSBp}*g_{m\_PMOS}/(I_{LSBn}*g_{m\_NMOS})$), since the model must only be proportional to the real physical current.

According to further embodiments, for a more precise calculation of the estimated sensor supply current $I_{estimate}$ a more detailed MOS model (e.g. $I=beta*(Ugs-Ut)^2$) may be used instead of the linearized conversion constant $g_m$. This can easily be extended to models as they are used in circuit simulators. The same can be done for the driver stage 207 (and its conversion constants $I_{LSBn}$, $I_{LSBp}$).

As mentioned before, according to further embodiments only one transistor (for example the first transistor 223a) may be sufficient to provide the supply voltage $V_{tr}$. In other words, other embodiments can be constructed using only one pass device, for example the PMOS transistor 223a if no pull down current is required. In this case, the digital model 217a can be modified such that the conversion constants 403b, the integrator or low pass filter 401b and the conversion constant 405b may be omitted.

Figure 7:
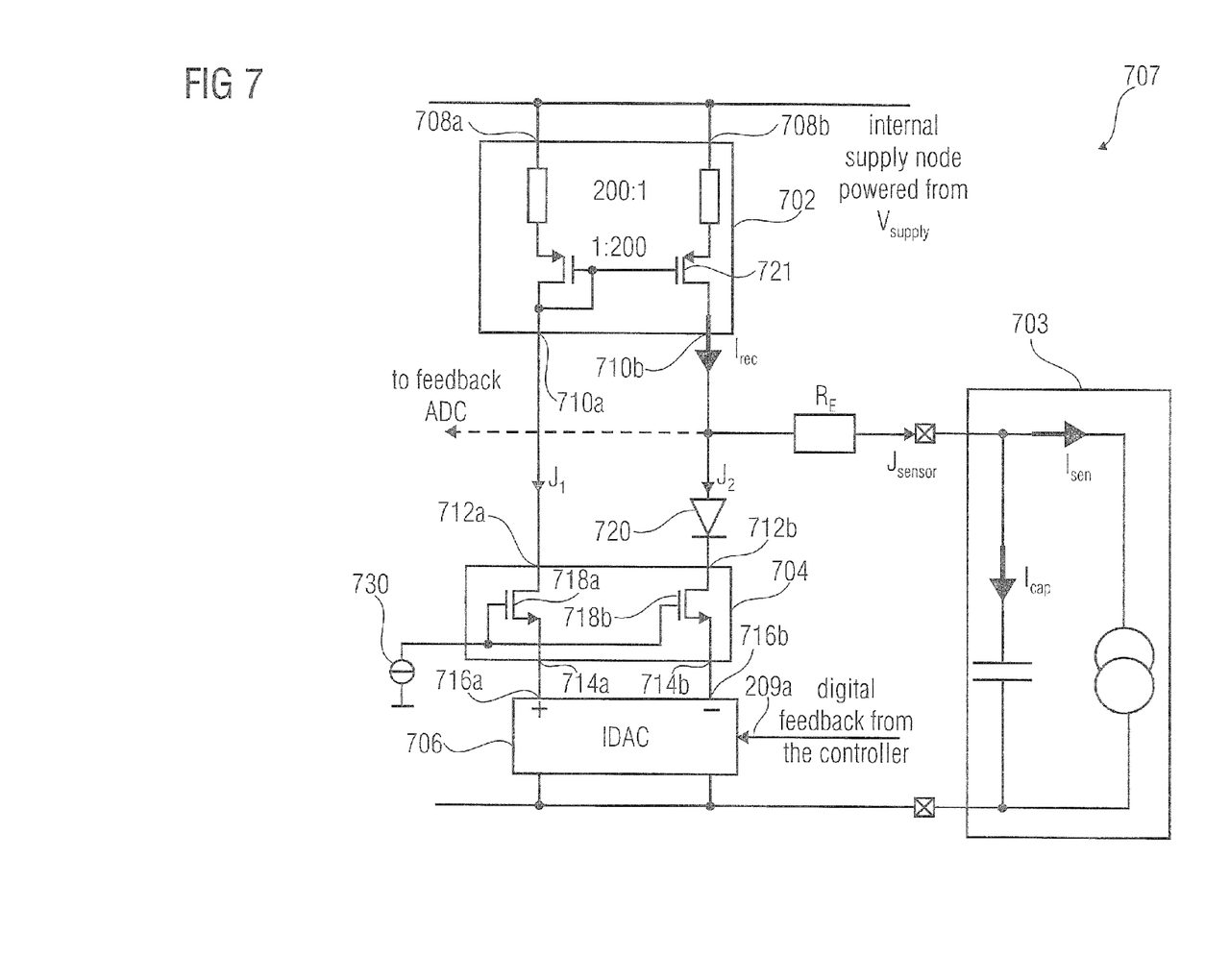
FIG. 7 shows an equivalent circuit of a driver stage according to an embodiment of the present invention.

FIG. 7 shows an equivalent circuit of a driver stage 707 according to an embodiment of the present invention. The driver stage 707 may be an alternate implementation of the driver stage 107. As an example, the driver stage 207 of the receiver 200 may be replaced with the driver stage 707. In this case, only one digital control signal may be provided by the digital control unit 215 (for example the digital control signal 209a). Furthermore, the digital model 217 may be adapted according to the driver stage 707.

The driver stage 707 comprises a current mirror 702, a cascode 704 (for example a high voltage cascode 704) and a current steering digital to analog converter 706 (IDAC), the driver stage 707 is coupled to a transmitter 703.

The current mirror 702 comprises a first input terminal 708a and a second input terminal 708b. The input terminals 708a, 708b are coupled to a supply node, for example, having the voltage $V_{supply}$.

A first transistor 721 of the current mirror 702 may be in its functionality equal to the transistor 221a. The first transistor 721 of the current mirror 702 provides the supply voltage for the transmitter 703 at its drain terminal and the driver stage 707 is configured to vary a gate potential of the first transistor 721 based on the control signal 209, such that the supply voltage is a function of a drain source current $I_{rec}$ of the transistor 721.

Furthermore, the current mirror 702 comprises a first output terminal 710a and a second output terminal 710b. The output terminals 710a, 710b are coupled to input terminal 712a, 712b of the cascode 704.

A first output terminal 714a of the cascode 704 is coupled to a first current steering terminal 716a of the current steering DAC 706. A second output terminal 714b of the cascode 704 is coupled to a second current steering terminal 716b of the current steering DAC 706.

The current steering DAC 706 is configured to generate a first (differential) current $I_1$ from the current mirror 702 to the cascode 704 by steering a current into its first current steering terminal 716a. This current $I_1$ is mirrored by the current mirror 702, generating a second output current of the current mirror 702 $I_{rec}$. The current $I_{rec}$ is split up into a first component, a second (differential) current $I_2$ (into the cascode 704), and into a second component, the supply current $I_{sensor}$ for the transmitter 703.

In other words, the current steering DAC 706 steers the currents $I_1$, $I_2$ by sinking the currents $I_1$, $I_2$ in its current steering terminals 716a, 716b.

While the current mirror 702 generates the current $I_{rec}$ based on its transmission ratio (mirror scale factor) in dependence of the current $I_1$, the current steering DAC 706 adjusts the current $I_2$ by providing a (negative) current into its second current steering terminal 716b.

The current steering DAC 706 generates the currents at its current steering terminals 716a, 716b differential, this means if it increases the current at its first current steering terminal 716a, it decreases the current at its second current steering terminal 716b and vice versa.

The current may also be designated as control current for controlling the current mirror 702. The current mirror 702 acts as a current controlled current source (for the transmitter 103) providing the current $I_{rec}$, and therefore also the supply current $I_{sensor}$ for the transmitter 103.

The current steering DAC 706, for example, may be an array of current sources.

The current steering DAC 706 adjusts the currents at its current steering terminals 716a, 716b in dependence on the digital feedback received from the controller 205 or the digital control unit 215 (in dependence on the digital control signal 209a).

In one embodiment, the cascode 704 comprises a first transistor 718a and a second transistor 718b. The first transistor 718a is coupled in-between the output terminal 710a of the current mirror 702 and the first current steering terminal 716a of the current steering DAC 706. The second transistor 718b is coupled between the second output terminal 710b of the current mirror 702 and the second current steering terminal 716b of the current steering DAC 706. Gate terminals of the transistors 718a, 718b are coupled together and may be coupled to a fixed reference voltage source 730 providing the gate potentials for the gate terminals of the transistors 718a, 718b.

The cascode 704 provides constant potentials at the current steering terminal 716a, 716b (which are independent from the currents $I_1$, $I_2$). Furthermore, the cascode 704 acts as a high voltage cascade, this means voltages at the input terminals 712a, 712b of the cascode 704 may be larger than the voltages the current steering terminals 716a, 716b of the current steering DAC 706 can withstand. This enables a high supply voltage for the transmitter 103, for example, above 3V and below 15V, and a low supply voltage for the current steering DAC 706 (or for transistors of the current steering DAC 706), for example, below 3 Volt. A lower supply voltage for the current steering DAC 706 enables the use of transistors that are only compliant to low supply voltages (e.g. 1.5V) but allow a faster switching, and therefore a faster adaption of the currents $I_1$, $I_2$ upon a change of the supply current $I_{sensor}$ of the transmitter 103, caused by a current modulation.

Furthermore, the driver stage 707 may comprise a diode 720 for protection coupled in-between the second output terminal of the current mirror 702 and the second input terminal 712b of the cascode 704.

The functionality of the driver stage 707 is equal to the functionality of the driver stage 207. The driver stage 707 regulates the current $I_{rec}$ such that it follows $I_{sen}$ (the internal supply voltage of the transmitter 703). A blocking capacitor of the transmitter 703 may be chosen such that a capacitor current $I_{cap}$ is negligible. The current steering DAC 706 may adjust the currents $I_1$, $I_2$ such that the supply voltage of the transmitter 703 (always) stays in the predetermined range. In other words, the current steering DAC 706 is controlled via the digital feedback loop to reduce or even minimize variations of the supply voltage, even during a current modulation performed by the transmitter 703, such that the current $L_{cap}$ along the blocking capacitor of the transmitter 703 is reduced or even minimized.

Therefore the closed loop (of transmitter 703 and driver stage 707) may have a gain close to 1 at frequencies that contribute to the sensor signal. As an example 189 kHz may be the lowest spectral component in a transmission at 189 kBit/s. A bandwidth of the controller 205 may be chosen 2 MHz, such that at least some of the harmonics are taken into account (189 kHz*10≈2 MHz).

The open loop (without the transmitter 703) should have a gain larger 1 (e.g. larger 10).

Furthermore, a bandwidth of the controller 205 is chosen such that it is sufficient to follow the current.

The above mentioned especially applies for the frequency range of the signal of the message generated by the transmitter 703 by modulating its current consumption, for example as Manchester signal.

Using the current mirror 702 has the following advantages:

A fast proportional response, a gate voltage change is warped with a sqrt function of the diode and the sqrt function of the output transistor is compensated.

Although in the example of FIG. 7, the current mirror 702 is shown with a transmission ratio or mirror scale factor of 1:200, other transmission rates or mirror scale factors are also possible. Furthermore a current mirror can be introduced to scale the current I2 as well.

Although the transistors shown in FIG. 7 are MOSFET transistors, according to further embodiments, these transistors may be replaced by transistors of other types, for example, by bipolar transistors.

Figure 5:
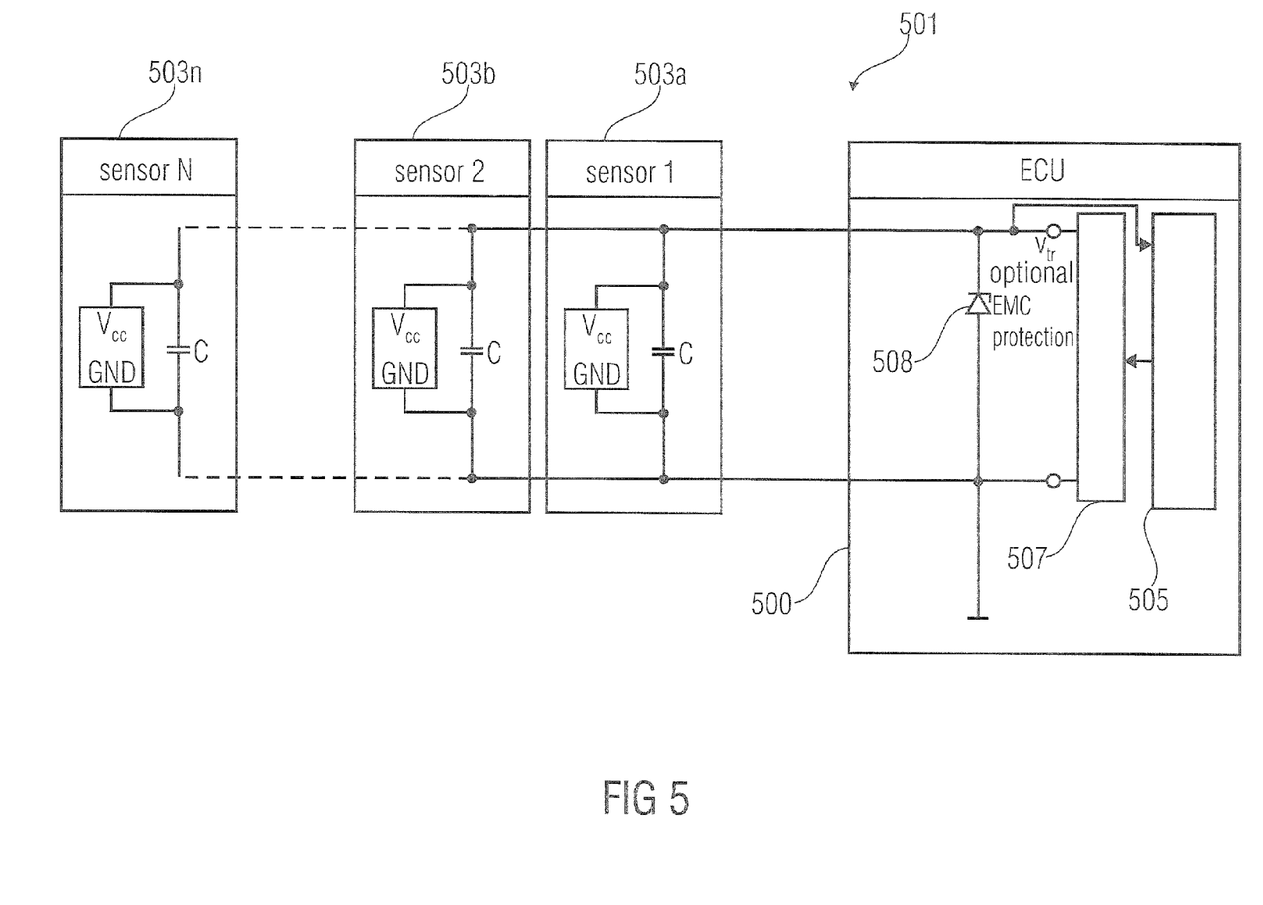
FIG. 5 shows a block schematic diagram of a receiver transmitter system according to an embodiment of the present invention.

FIG. 5 shows a block schematic diagram of a receiver transmitter system 501 according to an embodiment of the present invention. The receiver transmitter system 501 comprises a receiver 500 (for example, being an electrical control unit or being comprised in an electrical control unit, for example, of a car). Furthermore, the receiver transmitter system 501 comprises a first transmitter 503a (for example, comprising a sensor or being part of a sensor). The transmitter 503a is coupled (for example, directly connected) to the receiver 500. A functionality of the receiver 500 may be similar to the functionality of the receiver 100. The receiver 500 may comprise further functionalities, for example as described in conjunction with the receiver 200 according to FIG. 2. The receiver 500 comprises a driver stage 507 and a controller 505. The functionality of the controller 505 may be similar to the functionality of the controller 105, wherein the controller 505 may comprise further functionalities. The functionality of the driver stage 507 may be similar to the functionality of the driver stage 107, wherein the driver stage 507 may comprise additional features, for example like those described in conjunction with the receiver 200 shown in FIG. 2.

The transmitter 503a is configured to generate a message for the receiver 500 by modulating its current consumption.

According to further embodiments, the transmitter receiver system 501 may comprise a plurality of transmitters or sensors 503a to 503n, wherein each transmitter 503a to 503n is configured to generate a message for the receiver 500 by modulating its current consumption. The driver stage 507 of the receiver 500 is configured to provide the supply voltage $V_{tr}$ to each of the transmitters 503a to 503n. Each transmitter 503a to 503n is configured to generate a message by modulating its current consumption during a given time slot allotted to the respective transmitter 503a to 503n. In other words, typically only one transmitter of the plurality of transmitters 503a to 503n is active at a time and modulates its current consumption.

As mentioned before, the transmitters 503a to 503n may comprise sensors or may themselves be part of sensors, wherein a message generated by such a transmitter 503a to 503n comprises sensor data obtained by a sensor of the transmitter.

Furthermore, the receiver 500 may comprise an optional EMC protection diode 508 between a terminal for the supply voltage $V_{tr}$ and a ground terminal.

Figure 6:
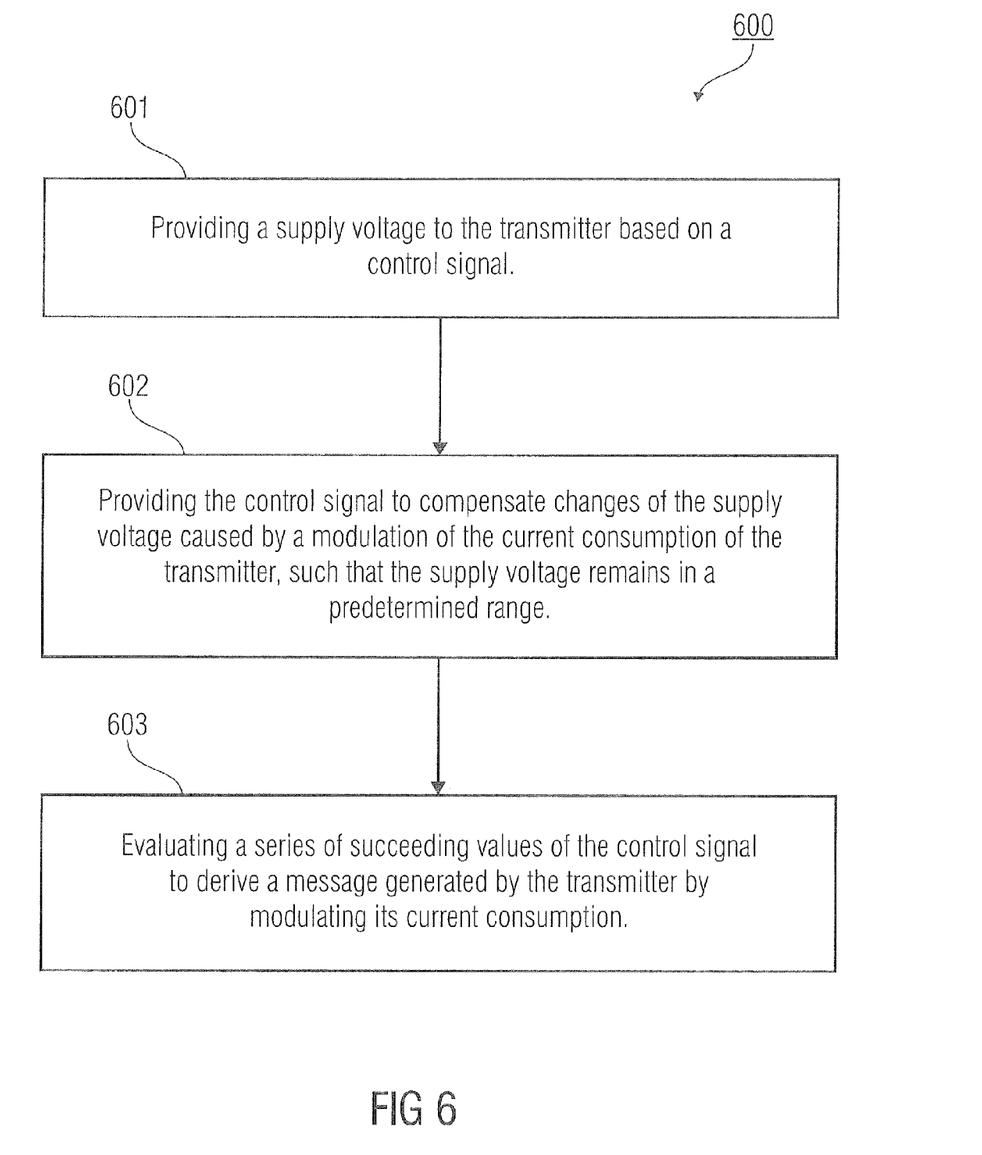
FIG. 6 shows a flow diagram of a method according to an embodiment of the present invention.

According to further embodiments the current from the second output terminal of the IDAC is scaled by additional current mirrors before it is connected to the output FIG. 6 shows a flow diagram of a method 600 according to a further embodiment.

The method 600 for receiving messages from a transmitter comprises a step 601 of providing a supply voltage to the transmitter based on a control signal.

Furthermore, the method 600 comprises a step 602 of providing the control signal to compensate for changes of the supply voltage caused by a modulation of the current consumption of the transmitter, such that the supply voltage remains in a predetermined range.

Furthermore, the method 600 comprises a step 603 of evaluating a series of succeeding values of the control signal to derive a message generated by the transmitter by modulating its current consumption.

This method 600 may be performed by a receiver (for example, by the receivers 100, 200, 500) according to an embodiment of the present invention.

According to an embodiment the receiver 100 may be a microcontroller or part of a microcontroller.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative of the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A receiver for receiving messages from a transmitter, the receiver comprising:
a controller; and
a driver stage for providing a supply voltage to the transmitter based on a control signal;
wherein the controller is configured to measure the supply voltage and to provide the control signal to compensate changes of the supply voltage caused by a modulation of the current consumption of the transmitter, such that the supply voltage remains in a predefined range, and
wherein the controller is further configured to evaluate a series of succeeding values of the control signal to derive a message generated by the transmitter by modulating its current consumption.

2. The receiver according to claim 1, wherein the controller is configured such that different values of the control signal correspond to different values of the supply current of the transmitter; and
wherein the controller is configured to map the series of succeeding values of the control signal to its corresponding values of the supply current of the transmitter to derive a series of succeeding values of the supply current of the transmitter representing the message generated by the transmitter.

3. The receiver according to claim 1, wherein the controller comprises a lookup table or a nonlinear function, the lookup table comprising a plurality of table entry pairs, each table entry pair comprising a value of the control signal and its corresponding value of the supply current; and
wherein the controller is configured to map a value of the control signal to its associated value of the supply current in the lookup table, to derive the message generated by the transmitter.

4. The receiver according to claim 1, wherein the controller comprises a model, the model comprising a filter that models a dynamic of the conversion of the control signals into the corresponding current values to derive the message.

5. The receiver according to claim 1, wherein the controller is configured to provide the control signal such that during a current modulation cycle of the transmitter the supply voltage varies at maximum by 25%.

6. The receiver according to claim 1, wherein the controller is configured to interpret a rising or falling slope of the current consumption of the transmitter as an information unit of the message generated by the transmitter.

7. The receiver according to claim 6, wherein the controller is configured to interpret a decrease or an increase in the current consumption of the transmitter as a falling slope or a rising slope of the current consumption if a difference between a value of the control signal before the decrease or increase of the current consumption and a value of the control signal for compensating the decrease or increase in current consumption is above a given threshold.

8. The receiver according to claim 1, wherein the controller is configured to interpret a comparatively high current consumption of the transmitter as a first information unit of the message generated by the transmitter and a comparatively low current consumption of the transmitter as a second information unit of the message generated by the transmitter.

9. The receiver according to claim 8, wherein the comparatively high current consumption is at least 50% larger than the comparatively low current consumption.

10. The receiver according to claim 1, wherein the controller is configured to interpret different levels of current consumption of the transmitter between a minimum and a maximum current consumption as different information units of the message generated by the transmitter.

11. The receiver according to claim 1, wherein the controller comprises a feedback analog-to-digital converter or a comparator configured to obtain a digital representation of the supply voltage provided by the driver stage; and wherein the controller is configured to evaluate the digital representation of the supply voltage to adjust the control signal.

12. The receiver according to claim 1, wherein the controller is configured to provide the control signal as a digital control signal; and
wherein the driver stage is configured to evaluate the digital control signal to provide the supply voltage based on the digital control signal.

13. The receiver according to claim 1, wherein the driver stage comprises a voltage controlled current source or a current controlled current source configured to provide the supply voltage; and
wherein the driver stage is configured to derive a control voltage or control current for controlling the voltage or current controlled current source based on the control signal.

14. The receiver according to claim 13, wherein the controller is configured to provide the control signal as digital control signal; and
wherein the driver stage comprises a driver digital-to-analog converter configured to derive the control voltage or current for controlling the voltage or current controlled current source based on the digital control signal.

15. The receiver according to claim 1, wherein the controller further comprises a digital model of the driver stage configured to estimate a supply current to the transmitter based on the control signal.

16. The receiver according to claim 1, wherein the driver stage comprises a first transistor configured to provide the supply voltage at its drain terminal, wherein the driver stage is configured to vary a gate potential of the first transistor based on the control signal, such that the supply voltage is a function of a drain source current of the first transistor.

17. The receiver according to claim 16, wherein the controller is configured to provide, upon a detection of a decrease of the supply voltage caused by an increased current consumption of the transmitter, the control signal for varying the gate potential of the first transistor such that an absolute average value of a drain source current of the first transistor is increased by the driver stage; and
wherein the controller is further configured to provide, upon a detection of an increase of the supply voltage caused by a decreased current consumption of the transmitter, the control signal for varying the gate potential of the first transistor such that an absolute average value of the drain source current of the first transistor is decreased by the driver stage.

18. The receiver according to claim 17, wherein the driver stage comprises a second transistor of a complementary type than the first transistor;
wherein a drain terminal of the second transistor is coupled to the drain terminal of the first transistor; and
wherein the driver stage is configured to vary the gate potential of the first transistor and a gate potential of the second transistor based on the control signal, such that the supply voltage is a function of drain source currents of the first transistor and the second transistor and a supply current for the transmitter.

19. The receiver according to claim 18, wherein the controller is configured to provide, upon a detection of a decrease of the supply voltage caused by an increased current consumption of the transmitter, the control signal for varying the gate potentials of the first transistor and the second transistor such that an absolute average value of the drain source current of the first transistor is increased and an absolute value of the drain source current of the second transistor is decreased by the driver stage; and
wherein the controller is further configured to provide, upon a detection of an increase of the supply voltage caused by a decreased current consumption of the transmitter, the control signal for varying the gate potentials of the first transistor and the second transistor such that an absolute average value of the drain source current of the first transistor is decreased and an absolute value of the drain source current of the second transistor is increased by the driver stage.

20. The receiver according to claim 18, wherein the controller is configured to provide a first control signal for varying the gate potential of the first transistor and a second control signal for varying the gate potential of the second transistor.

21. The receiver according to claim 16, wherein the driver stage comprises a current steering DAC for charging and discharging a gate terminal of the first transistor based on the control signal.

22. The receiver according to claim 1, wherein the driver stage comprises a current mirror and a current steering DAC;
wherein the current steering DAC is configured to adjust a first output current from a first input terminal to a first output terminal of the current mirror, based on the control signal;
wherein the current mirror is configured to mirror the first output current, such that a second output current of the current mirror from a second input terminal to a second output terminal of the current mirror follows the first output current of the current mirror; and
wherein a supply current for the transmitter is based on the second output current of the current mirror.

23. The receiver according to claim 22, wherein the current steering DAC comprises a first current steering terminal coupled to the first output terminal of the current mirror, and configured to steer the first output current of the current mirror; and
wherein the second output current of the current mirror is divided into a first component and a second component;
wherein the current steering DAC comprises a second current steering terminal being coupled to the second output terminal of the current mirror, for steering the supply voltage of the transmitter by sinking the first component of the second output current into the second current steering terminal;
wherein the driver stage is configured to provide the second component of the second output current as the supply current of the transmitter.

24. The receiver according to claim 23, wherein the second output current from the second output terminal of the current steering DAC is scaled by at least an additional current mirror before it is fed to the transmitter.

25. A transmitter receiver system, comprising:
a transmitter configured to generate a message for the receiver by modulating its current consumption; and
a receiver comprising:
a controller; and
a driver stage configured to provide a supply voltage to the transmitter based on a control signal;
wherein the controller is configured to measure the supply voltage and to provide the control signal to compensate for changes of the supply voltage caused by a modulation of the current consumption of the transmitter, such that the supply voltage remains in a predefined range; and wherein the controller is further configured to evaluate a series of succeeding values of the control signal to derive a message generated by the transmitter by modulating its current consumption.

26. The transmitter receiver system according to claim 25, further comprising a plurality of transmitters, wherein each transmitter is configured to generate a message for the receiver by modulating its current consumption;
   wherein the driver stage of the receiver is configured to provide the supply voltage to each of the transmitters; and
   wherein each transmitter is configured to generate a message by modulating its current consumption during a given time slot allotted to the respective transmitter.

27. The transmitter receiver system according to claim 25, wherein the transmitter is part of a sensor and wherein the message generated by the transmitter comprises sensor data obtained by the sensor.

28. A method for receiving messages from a transmitter, the method comprising:
   providing a supply voltage to the transmitter based on a control signal;
   measuring the supply voltage;
   providing the control signal to compensate changes of the supply voltage caused by a modulation of the current consumption of the transmitter, such that the supply voltage remains in a predetermined range; and
   evaluating a series of succeeding values of the control signal to derive a message generated by the transmitter by modulating its current consumption.

29. A computer readable digital non-transitory storage medium having stored thereon a computer program having a program code for performing, when running on a computer, a method according to claim 28.

30. A receiver for receiving messages from a transmitter, the receiver comprising:
   a controller; and
   a driver stage configured to provide a supply voltage to the transmitter based on a control signal;
   wherein the controller is configured to measure the supply voltage and to provide the control signal to compensate for changes of the supply voltage caused by a modulation of the current consumption of the transmitter, such that the supply voltage remains in a predefined range;
   wherein the controller comprises a comparator configured to obtain a digital representation of the supply voltage provided by the driver stage;
   wherein the controller is configured to evaluate the digital representation of the supply voltage to adjust the control signal; and
   wherein the controller is configured to evaluate a series of succeeding values of the control signal using a digital model of the driver stage to estimate a supply current of the transmitter to derive a message generated by the transmitter by modulating its current consumption;
   wherein the controller is configured to interpret a rising or falling slope of the current consumption of the transmitter as an information unit of the message generated by the transmitter;
   wherein the controller is configured to interpret a decrease or an increase in the current consumption of the transmitter as a falling slope or a rising slope of the current consumption if a difference between a value of the control signal before the decrease or increase of the current consumption and a value of the control signal for compensating the decrease or increase in current consumption is above a given threshold;
   wherein the driver stage comprises a current mirror and a current steering DAC;
   wherein the current steering DAC is configured to adjust a first output current from a first input terminal to a first output terminal of the current mirror, based on the control signal;
   wherein the current mirror is configured to mirror the first output current, such that a second output current of the current mirror from a second input terminal to a second output terminal of the current mirror follows the first output current of the current mirror;
   wherein a supply current for the transmitter is based on the second output current of the current mirror;
   wherein the current steering DAC comprises a first current steering terminal being coupled to the first output terminal of the current mirror, for steering the first output current of the current mirror; and
   wherein the second output current of the current mirror is divided into a first component and a second component;
   wherein the current steering DAC comprises a second current steering terminal being coupled to the second output terminal of the current mirror, and is configured to steer the supply voltage of the transmitter by sinking the first component of the second output current into the second current steering terminal;
   wherein driver stage is configured to provide the second component of the second output current is provided as the supply current of the transmitter;
   wherein the controller is configured to provide upon a detection of a decrease of the supply voltage caused by an increased current consumption of the transmitter the control signal, such that the first output current of the current mirror is increased and the first component of the output current of the current mirror sinking into the second current steering terminal of the current steering DAC is decreased; and
   wherein the controller is configured to provide, upon a detection of an increase of the supply voltage caused by a decreased current consumption of the transmitter, the control signal, such that the first output current of the current mirror is decreased and the first component of the output current of the current mirror sinking into the second current steering terminal of the current steering DAC is increased.

* * * * *